(No Model.) 3 Sheets—Sheet 1.

E. B. BARKER.
ROLL HOLDER FOR PHOTOGRAPHIC CAMERAS.

No. 408,451. Patented Aug. 6, 1889.

WITNESSES:
C. Neveux
E. Sedgwick

INVENTOR:
E. B. Barker
BY Munn & Co
ATTORNEYS.

(No Model.) 3 Sheets—Sheet 2.

E. B. BARKER.
ROLL HOLDER FOR PHOTOGRAPHIC CAMERAS.

No. 408,451. Patented Aug. 6, 1889.

WITNESSES:
C. Neveux
C. Sedgwick

INVENTOR:
E. B. Barker
BY Munn & Co
ATTORNEYS.

(No Model.) 3 Sheets—Sheet 3.

E. B. BARKER.
ROLL HOLDER FOR PHOTOGRAPHIC CAMERAS.

No. 408,451. Patented Aug. 6, 1889.

WITNESSES:
C. Neveux
C. Sedgwick

INVENTOR:
E. B. Barker
BY Munn & Co
ATTORNEYS.

UNITED STATES PATENT OFFICE.

ERASTUS B. BARKER, OF NEW YORK, N. Y., ASSIGNOR TO THE E. & H. T. ANTHONY & COMPANY, OF SAME PLACE.

ROLL-HOLDER FOR PHOTOGRAPHIC CAMERAS.

SPECIFICATION forming part of Letters Patent No. 408,451, dated August 6, 1889.

Application filed October 19, 1886. Serial No. 216,645. (No model.) Patented in England November 3, 1885, No. 13,261.

*To all whom it may concern:*

Be it known that I, ERASTUS B. BARKER, of the city and State of New York, have invented certain new and useful Improvements in Roll-Holders for Photographic Cameras, of which the following is a full, clear, and exact description.

This invention relates to holders for photographic cameras, in which a roll of sensitized paper or tissue is used within what is commonly known as the "plate-holder," or within a portion of the camera corresponding thereto, said roll to be drawn upon as required to expose successively different portions of its surface for the purpose of making a series of photographic pictures one after another.

My invention mainly consists in a combination, with a plate or sensitized sheet-holder, of removable light-tight cases or boxes for carrying the sensitized paper and for supplying and taking up the exposed portions of the roll.

The invention further consists in certain constructions and combination of details, substantially as hereinafter described and claimed.

Reference is to be had to the accompanying drawings, forming a part of this specification, in which similar letters of reference indicate corresponding parts in all the figures.

Figure 1:
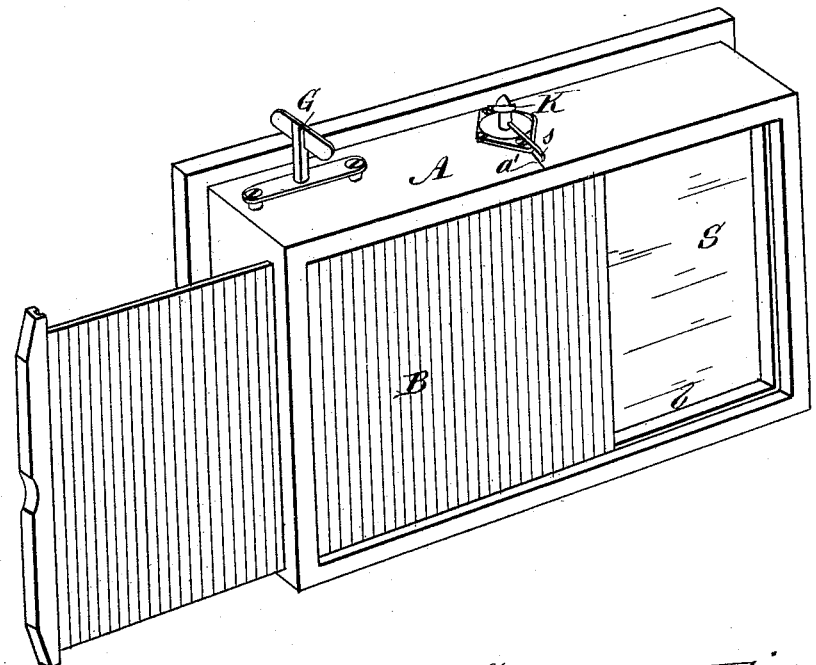
Figure 2:
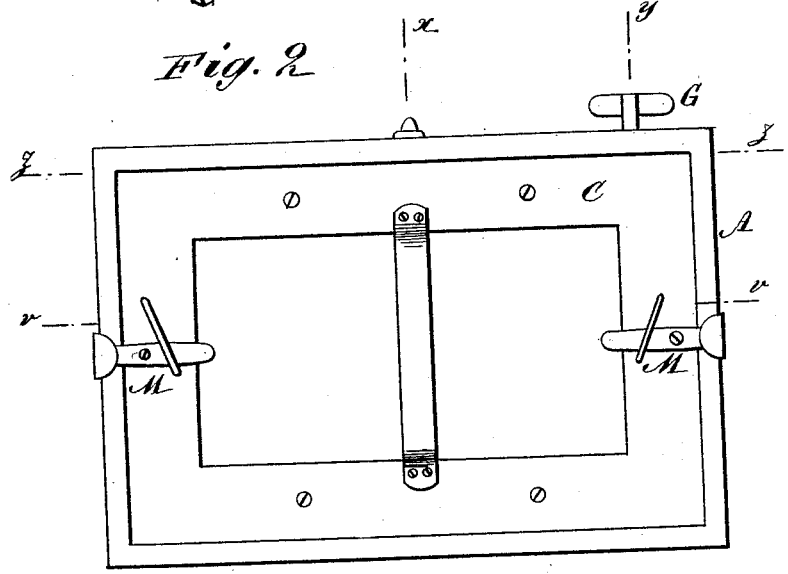
Figure 3:
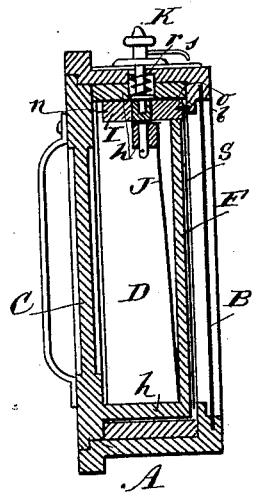
Figure 4:
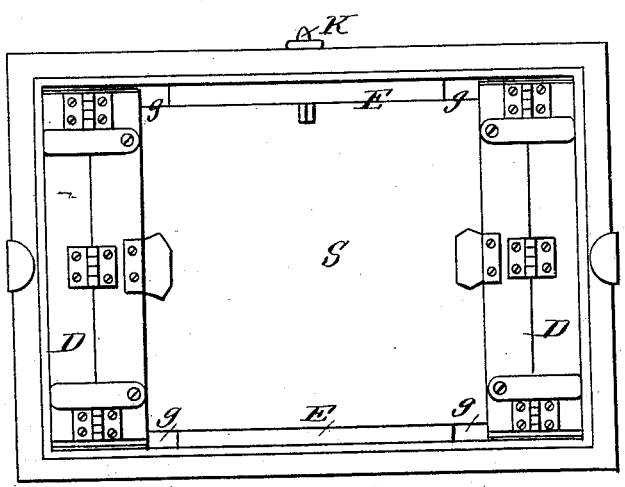
Figure 5:
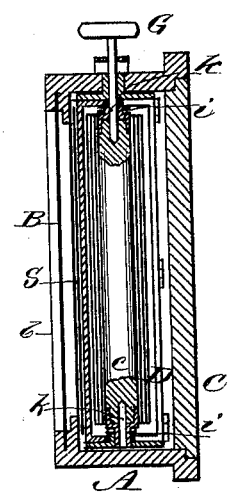
Figure 6:
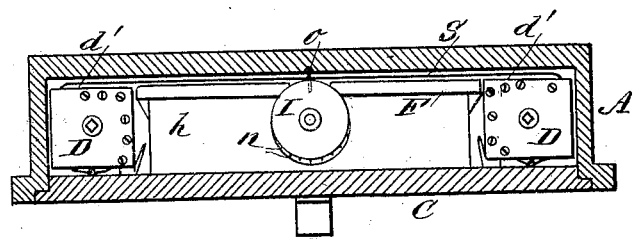
Figure 7:
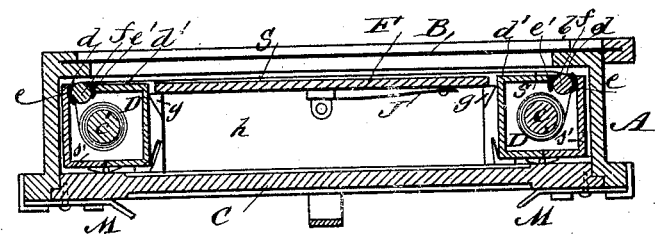
Figure 8:
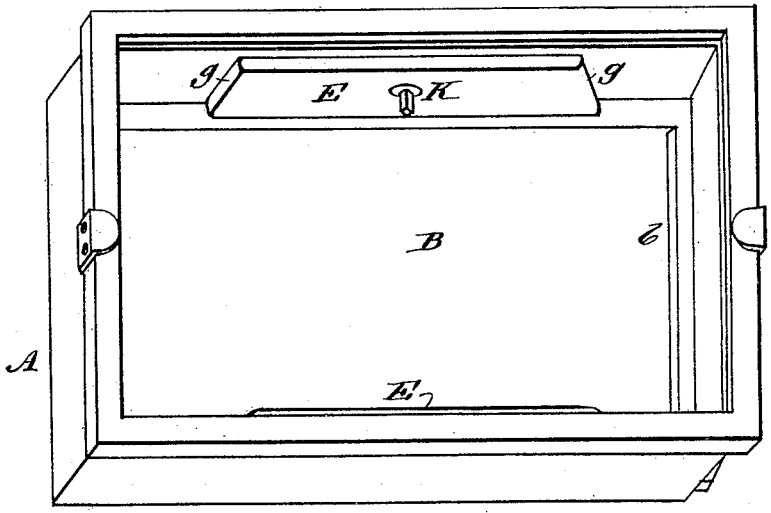
Figure 9:
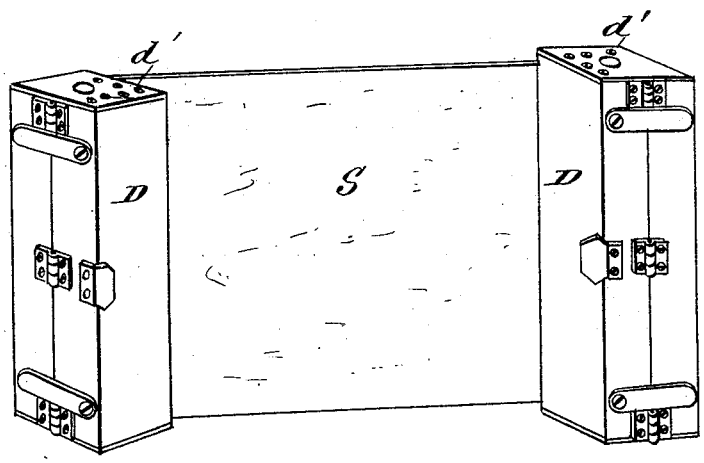

Figure 1 represents a view in perspective as seen from its front of a roll-holder for photographic cameras embodying my invention and with its sliding shutter partly drawn out. Fig. 2 is a rear view of said holder, and Fig. 3 is a transverse section thereof upon the line $x\, x$ in Fig. 2. Fig. 4 is a rear view of the holder in part with its back removed. Fig. 5 is a transverse section upon the line $y\, y$ in Fig. 2. Fig. 6 is a horizontal or longitudinal section upon the line $z\, z$ in Fig. 2, and Fig. 7 is a like section upon the line $v\, v$ in Fig. 2. Fig. 8 is a perspective view of the plate-holder part of the device, as seen from its interior; and Fig. 9 is a perspective view of the light-tight cases or boxes, together with the sensitized sheet carried by the same ready for insertion within the plate-holder.

A indicates an outer casing or frame, or what may be termed the "plate-holder" of the camera, having an exposing-opening $b$ in front, closed by the ordinary sliding shutter B, and fitted with a removable back C.

D D are a pair of light-tight boxes or cases fitted within the plate-holder A—that is, one in either end thereof. These light-tight boxes serve to carry the sensitized paper or sheet S, and to supply and take up the same as it is drawn from a roll in one box and collected in a like form in the other, exposing the intermediate portion to the opening $b$ when the shutter B is withdrawn. Both of said boxes are or may be similarly constructed, and when not required for use in the plate-holder may be removed and carried about the person for use to supply sensitized paper as required, or, when the sensitized paper contained in them is used up, may be replaced by other like boxes carrying a fresh supply of sensitized paper. Said boxes, which may readily be inserted in and taken out of the plate-holder, are of rectangular form corresponding to the interior end portions of the plate-holder, and are provided with a hinged or other lid $s'$, making a light-tight joint with the body part of the box, and serving when opened to allow of the introduction and removal of the sensitized sheet. Each of said boxes is fitted with a roller, to one of which the sensitive paper is secured at its one end and wound or rolled upon and its free end passed out through a longitudinal opening $d$ in the face side of the case, which opening is made light-tight both when the paper is wholly within the case and as it is being drawn in or out thereof—as, for instance, by fitting the case where the paper passes in or out with a soft flexible flap $e$ and a guide or roller $f$, between which the sensitized paper passes, another like flap $e'$ being applied to the opposite side of the roller $f$ to make it also light-tight on that side.

In the invention which is the subject of this specification I use two of such light-tight boxes or cases D D, arranged, as described, within the plate-holder A for exposure of the sensitized sheet to the opening $b$. Either of these boxes or cases D may be the paper carrying and distributing one and the other the take-up one, as the paper is intermittently passed over the opening $b$ to take a succession of negatives or prints. When required to use the two boxes for exposure of a portion of the sensitized sheet, a proper length of said paper is drawn out from the filled box or case D and its outer end passed through the light-tight opening $d$ in the other box D and secured to the roller therein. This may be done before inserting the boxes or cases D D within the plate-holder A. If this is done in the open light it of course will destroy the sensitiveness of such first-drawn portion of the sheet; but this will bear such a small proportion to the entire length of the sheet or roll that the loss is of little or no account. The two boxes, with the sensitized sheet extending between them, are then inserted to their places within the plate-holder A, and after the shutter B has been closed and the removable back C inserted and secured to its place the roller $c$ of the box D, which constitutes the take-up one, is rotated, so as to take up the first exposed portion of the sheet and to draw out from the other or supply box D a fresh and unimpaired portion of the sheet of suitable length for exposure through the opening $b$ of the plate-holder, when adjusted to the camera and the shutter B is opened for the purpose. The adjustment of the sensitized sheet under cover of the closed plate-holder may be made repeatedly to take any number of pictures in succession till the whole roll of sensitized paper is used up without having recourse to a dark-room.

To secure the proper position of the boxes D D apart in the plate-holder, they are entered on withdrawing the back C and laying the plate-holder, with its open back uppermost, down within either end of said holder and are quickly guided to their places and retained at their proper distance apart by means of guide-boards E E, having sloping ends $g$ $g$ secured to opposite sides of the interior of the plate-holder, after which the back C is closed to hold said boxes to their places with the unrolled or flat portion of the sensitive paper covering the opening $b$ in the plate-holder between them.

The removable back C is provided on its inner face with a back-supporting board or plate F for the paper between the boxes D D, said plate being of a suitable size and arranged at a suitable distance from the inner face of the back C for the purpose and serving to keep the paper smooth and level over the opening $b$. Said paper-supporting board may be connected with the inner face of the back C by side pieces $h$ $h$. Being an attachment to the back C, whenever said back is inserted to its place the paper-supporting board or plate will be in its place, and its outer surface will be in the same plane as the front faces $d'$ of the boxes D-D, which thus combine with the board or plate F to form a flat even table on which the sheet is stretched and supported in a flat and even position.

The rollers $c$ of the boxes D D have tension put upon them by means of spring-washers $i$, interposed between their ends and the ends of said boxes, and each of said rollers is provided at one or both of its ends with an internally-angular axial socket $k$, for the engagement of a key G with the one socket $k$ of the roller $c$ of the case or box D, which happens to be the take-up, for the purpose of rotating said roller to take up or adjust the sensitized sheet S in measured lengths successively over the opening $b$ in the plate-holder.

A registering and indicating mechanism of peculiar character is also used in connection with the roll-holder for determining the feed of the sheet or roll of sensitized paper, in order that when applying the key to the take-up roller only so much of the sensitized paper will be unrolled and passed over the exposing-opening $b$ in the plate-holder as is necessary for one picture at a time. This registering mechanism consists, in part, of a roller I, having teeth $n$ arranged to register or engage with one of the longitudinal margins of the sensitized sheet on its back between the boxes D D. Said roller I is pressed up in contact with the sheet by a bent spring J, attached to the back of the paper-supporting plate F, the spring J being connected at its free end with the bearing of said roller, so that the roller will be automatically rotated as the sensitized sheet is drawn over or in contact with it. Said roller I is also provided, out of line with or to one side of the teeth $n$, with a pricker or marker $o$ on its periphery to perforate the paper at the point or place it should be divided to separate one negative from another on the sheet after removing the sheet or roll from the holder, the roller I being of a suitable diameter, so that two or more revolutions of it will mark the sheet or paper S at the proper place for division. If desired, there may be two of such marking-rollers arranged opposite each other on opposite sides of the plate-holder to simultaneously mark the opposite margins of the sheet. K is a sliding indicator capable of operation from the exterior of the plate-holder A, and constructed to engage by an angular shank with an angular socket or hole in the center of the roller I, it being forcibly pressed inward for the purpose by a spring $r$. Upon the exterior of this indicator K may be an index or finger $s$. The indicator, which is a rotary as well as a longitudinally-sliding one, is turned by its engagement with the marking wheel or roller I, and causes the said index $s$ to come opposite a mark or line $a'$ on the outside of the plate-holder, thus indicating that the proper amount of the feed or take-up has been given by the key G to the sensitized sheet for a fresh exposure of its surface over the opening $b$ in the plate-holder.

Instead of the index $s$, mere marks or other means may be used in connection with the rotating indicator to determine its extent of movement and feed of the sheet. The indicator K, when constructed to have a longitudinal sliding as well as a rotary motion, as described, also serves by its engagement with the roller I, connected with the back C, as a catch to hold said back closed, so that before removing said back it will be necessary to slide out or withdraw the indicator K from its engagement with the wheel or roller I. Additional clamps or turn-button fastenings M may also be used to hold the back C closed.

The construction of the light-tight boxes D D herein mentioned is described and claimed in Letters Patent No. 337,963, dated March 16, 1886, to William H. Lewis and Erastus B. Barker, and I therefore make no claim thereto in this application.

Having thus fully described my invention, what I claim as new, and desire to secure by Letters Patent, is—

1. The combination, with the plate or sensitized sheet holder, of the independent removable light-tight boxes constructed, as described, to carry the sensitized paper and permit the same to be rolled and unrolled and passed from one box to the other in front of the opening of the holder, substantially as specified.

2. In combination with the holder A, having a front opening b, and a shutter controlling said opening, the removable light-tight cases or boxes D D, adapted to fit within opposite ends of said holder and provided with light-tight openings d for passage of the sensitized sheet in and out of said boxes, also fitted with supply and take-up rollers c, adapted at their end or ends to receive a key, essentially as and for the purpose herein set forth.

3. The guide plates or boards E E on the inside of the holder A, in combination with the removable boxes D D, for carrying and supplying the sensitized sheet or roll, substantially as specified.

4. The combination, with the holder A and boxes D D, of the back C, provided with an inner board or plate F, flush on its front surface with the faces of said boxes and adapted, in conjunction with the boxes, to support the sensitized sheet at its back in rear of the exposing-opening in the holder, essentially as described.

5. In roll-holders for photographic cameras, provided with a registering and marking wheel adapted to engage with the sensitized paper or film, the registering wheel or rollers I, arranged intermediately of the supply and take-up rollers of the holder and having teeth n, and a pricker or marker o at one side of the teeth, in combination with a spring applied to said registering wheel or roller and operating to force the latter outward against the sensitized paper or film, substantially as specified.

6. In roll-holders for photographic cameras, provided with an exterior rotating indicator actuated by the sensitized paper or film when in motion for determining the extent of movement and feed of the sheet, the rotary indicator K, having also a sliding movement in direction of the length of the axis, in combination with the casing A and marking-wheel I, as shown and described, whereby on longitudinally operating the indicator the removal and insertion of the back C is effected, as set forth.

7. The combination, with a photographic roll-holder, of an indicator capable of longitudinal movement in its bearings and provided with a recess in its end and with a spring and a marking-wheel.

8. In combination with a photographic plate and roll holder, detachable boxes or cases containing rollers for holding the sensitized paper.

ERASTUS B. BARKER.

Witnesses:
EDW. M. CLARK,
C. SEDGWICK.